United States Patent
Pejathaya et al.

(10) Patent No.: US 7,121,624 B2
(45) Date of Patent: Oct. 17, 2006

(54) SEAT ASSEMBLY HAVING MANUAL TUMBLE WITH INTERLOCK AND POWERED RECLINE, FOLD AND KNEEL

(75) Inventors: Srinivas Pejathaya, St. Clair Shores, MI (US); Jeffery T Bonk, Clinton Township, MI (US); Christopher J Ryan, Fraser, MI (US); David L Robinson, Sterling Heights, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 11/035,405

(22) Filed: Jan. 13, 2005

(65) Prior Publication Data
US 2006/0152058 A1    Jul. 13, 2006

(51) Int. Cl.
B60N 2/36 (2006.01)

(52) U.S. Cl. .................. 297/378.12; 297/331; 297/335; 297/336; 297/378.14

(58) Field of Classification Search ................ 297/336, 297/335, 331, 378.12, 378.14
See application file for complete search history.

(56) References Cited

U.S. PATENT DOCUMENTS

| | | | |
|---|---|---|---|
| 3,880,464 A | 4/1975 | Murphy et al. | |
| 4,245,866 A | 1/1981 | Bell | |
| 4,475,769 A | 10/1984 | Crawford et al. | |
| 4,484,776 A | 11/1984 | Gokimoto et al. | |
| 4,636,003 A | 1/1987 | Siebler | |
| 4,695,094 A | 9/1987 | Siebler | |
| 4,700,989 A | 10/1987 | Ercilla | |
| 4,736,985 A | 4/1988 | Fourrey et al. | |
| 4,898,424 A | 2/1990 | Bell | |
| 4,929,024 A | 5/1990 | Secord | |
| 4,962,963 A | 10/1990 | Robinson | |
| 5,052,752 A | 10/1991 | Robinson | |
| 5,199,764 A | 4/1993 | Robinson | |
| 5,263,758 A * | 11/1993 | Legendre et al. | 297/336 X |
| 5,660,440 A | 8/1997 | Pejathaya | |
| 5,711,577 A | 1/1998 | Whalen | |
| 5,718,482 A | 2/1998 | Robinson | |
| 5,765,894 A | 6/1998 | Okazaki et al. | |
| 5,769,493 A | 6/1998 | Pejathaya | |
| 5,823,622 A | 10/1998 | Fisher, IV et al. | |
| 5,918,939 A | 7/1999 | Magadanz | |
| 5,947,560 A | 9/1999 | Chen | |
| 5,979,986 A | 11/1999 | Pejathaya | |
| 6,000,742 A | 12/1999 | Schaefer et al. | |
| 6,017,090 A | 1/2000 | Bonk | |
| 6,039,399 A | 3/2000 | Whalen et al. | |
| 6,131,999 A * | 10/2000 | Piekny et al. | 297/378.12 |
| RE37,026 E | 1/2001 | Whalen | |
| 6,199,951 B1 * | 3/2001 | Zeile et al. | 297/378.12 X |
| 6,220,665 B1 | 4/2001 | Dingel et al. | |
| 6,290,297 B1 | 9/2001 | Yu | |
| 6,322,146 B1 | 11/2001 | Fisher, Jr. | |

(Continued)

*Primary Examiner*—Rodney B. White
(74) *Attorney, Agent, or Firm*—Harness, Dickey & Pierce P.L.C.

(57) ABSTRACT

A seat adjustment mechanism for a vehicle seat including a seat bottom supported by the vehicle and a seatback coupled to the seat bottom is provided. The seat adjustment mechanism includes a first kneel mechanism connected to the vehicle seat and a powered motor operably connected to the first kneel mechanism. The powered motor drives the first kneel mechanism to translate the seatback and seat bottom relative the vehicle to manipulate the seat assembly into a desired configuration.

34 Claims, 15 Drawing Sheets

U.S. PATENT DOCUMENTS

| | | |
|---|---|---|
| 6,345,867 B1 | 2/2002 | Hellrung et al. |
| 6,375,255 B1 | 4/2002 | Maruta et al. |
| 6,478,358 B1 | 11/2002 | Okazaki et al. |
| 6,513,873 B1 | 2/2003 | Tsuda et al. |
| 6,520,581 B1 | 2/2003 | Tame |
| 6,523,899 B1 | 2/2003 | Tame |
| 6,547,332 B1 | 4/2003 | Pejathaya |
| 6,568,758 B1 | 5/2003 | Berg et al. |
| 6,595,588 B1 | 7/2003 | Ellerich et al. |
| 6,637,819 B1 * | 10/2003 | Tame ................. 297/335 X |
| 6,655,738 B1 | 12/2003 | Krammerer |
| 6,655,741 B1 | 12/2003 | Bonk |
| 6,698,837 B1 | 3/2004 | Pejathaya et al. |
| 6,857,703 B1 | 2/2005 | Bonk |
| 6,860,562 B1 | 3/2005 | Bonk |
| 6,883,868 B1 * | 4/2005 | Yoshida ................. 297/331 |
| 2005/0006940 A1 * | 1/2005 | Yoshida ............. 297/378.12 |

* cited by examiner

SEAT ASSEMBLY HAVING MANUAL TUMBLE WITH INTERLOCK AND POWERED RECLINE, FOLD AND KNEEL

FIELD

The present teachings relate to a seat assembly and, more particularly, to a seat assembly with recline, fold, kneel, tumble and interlock features.

BACKGROUND

In automotive applications, it is desirable for a vehicle to accommodate various requirements, such as cargo carrying and the like. To that end, reconfiguration of a vehicle seating system plays a role. Dumping, folding flat, and/or kneeling a seating system are examples of configurations that enable a vehicle interior to accommodate cargo-carrying needs, thus improving storage capability.

Seat assemblies typically include a plurality of mechanisms to toggle the seat between a seating position, a reclined position, a dumped position, and a kneel position to allow an occupant to selectively configure the seat assembly as desired. For example, seat assemblies generally include a recliner mechanism for enabling pivotal motion of a seatback relative to a seat bottom. Also, to provide dumping or stowing of the seat assembly, an integrated recliner and floor-latch mechanism may be provided. The recliner mechanism serves to manipulate the seatback relative to the seat bottom. A floor-latch mechanism may extend downwardly from the seat bottom for selective engagement with a floor. After the recliner mechanism reclines the seatback to a fold-flat position, releasing the floor-latch mechanism allows the seat assembly to be rolled or tumbled forward into a dumped position. In addition, the seat assembly may include a kneel mechanism to provide the ability to further articulate a seat to increase cargo area. A kneel mechanism is provided to enable such articulation. A lever actuates the kneel mechanism to cause the seat assembly to lean or kneel forward relative to its normal operating position.

The recliner, floor-latch, and kneel mechanisms are typically operated through a remote actuator. The remote actuator serves to selectively actuate the particular mechanism (i.e., recliner, floor-latch, or kneel) to provide a desired seating configuration. For example, an actuation handle may be provided at a remote location from the recliner and floor-latch mechanisms to allow an occupant to manipulate the seat assembly into a desired position. The remote actuator commonly includes a cable tied to the particular mechanism at a distal end and to an actuation handle at a proximal end. The actuation handle is typically rotatably supported by one of the seatback, seat bottom, or vehicle structure such that a force applied to the handle is transmitted to the cable and associated mechanism (i.e., recliner, floor-latch, or kneel).

Transmission of the force from the actuation handle to the cable causes the cable to be placed under tension and thereby transmit the force to the particular mechanism. Once the force reaches the mechanism, internal components of the respective mechanism are articulated and the mechanism is toggled into an unlocked position. For example, an actuation handle tied to a recliner mechanism allows an occupant to adjust the angular position of a seatback relative to a seat bottom simply by rotating the actuation handle. The rotational force applied to the actuation handle is transmitted to the recliner mechanism by the cable and serves to disengage the seatback from engagement with the recliner mechanism, thereby placing the recliner mechanism in an unlocked condition. When the recliner mechanism is in the unlocked condition, the occupant is allowed to adjust the angular position of the seatback relative to the seat bottom. A similar actuation handle may be associated with the floor-latch and kneel mechanisms to actuate the respective mechanisms and configure the seat assembly into a desired position.

Traditional seat assemblies suffer from a disadvantage that even though the seat assembly may not be properly engaged with the floor or properly engaged in an upright position, the seatback is fully actuable and positionable relative to the seat. As can be appreciated, the floor latch mechanism or kneel mechanism may appear to be fully latched when returned to a usable position when in fact either may be in an unlatched condition. This is particularly true in the case of a kneeling function because the seat assembly is not drastically out of position from its fully latched and secure position.

Furthermore, while conventional remote actuation devices adequately provide an occupant with the ability to actuate a seat mechanism such as a recliner, floor-latch, or kneel mechanism, conventional remote actuation devices suffer from the disadvantage of requiring a force to unlock the particular mechanism. As can be appreciated, such forces may be large depending on the configuration of internal locking components of each mechanism and therefore may be difficult to operate.

SUMMARY

A seat assembly generally includes a seat bottom, a seatback pivotally supported by the seat bottom, and a seat adjustment mechanism. The seat adjustment mechanism may include a kneel mechanism connected to the vehicle seat, a powered motor operably connected to the kneel mechanism and operable to translate the seatback and seat bottom, and a latch mechanism supported by the seat bottom and operable between a locked position and an unlocked position. The latch mechanism may be operated to pivot the seat bottom in the unlocked position.

The seat assembly may also include a recliner mechanism pivotably connecting the seatback relative the seat bottom and cooperating with the kneel mechanism to define an angular position of the seatback relative the seat bottom. The recliner mechanism may further cooperate with the kneel mechanism to position the vehicle seat in a dump position.

The seat assembly may also include an interlock mechanism restricting actuation of the latch mechanism into the unlocked position until the seat assembly is in a fully kneeled position, and restricting rotation of the seatback when the latch mechanism is in the unlatched position. The interlock mechanism may include a sector plate fixedly supported by the seat bottom and an interlock pin slidably supported by the latch mechanism. The sector plate may include a recess and a cam surface, wherein the recess receives the interlock pin to permit actuation of the latch mechanism and engages the cam surface to prevent actuation of the latch mechanism.

The seat may include a link rotatably supported by the sector plate at a first end and rotatably supported by the latch mechanism at a second end, wherein the link is operable to rotate the seatback relative to the seat bottom in response to rotation of the latch mechanism.

The kneel mechanism may be a linear adjustment mechanism including a housing and a recliner rod, wherein the recliner rod is operable to reciprocate linearly relative to the housing to position the seat relative to the vehicle. The housing may include a gear assembly in meshed engagement with the recliner rod to provide linear movement of the recliner rod relative to the housing.

Further areas of applicability will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

Figure 1:
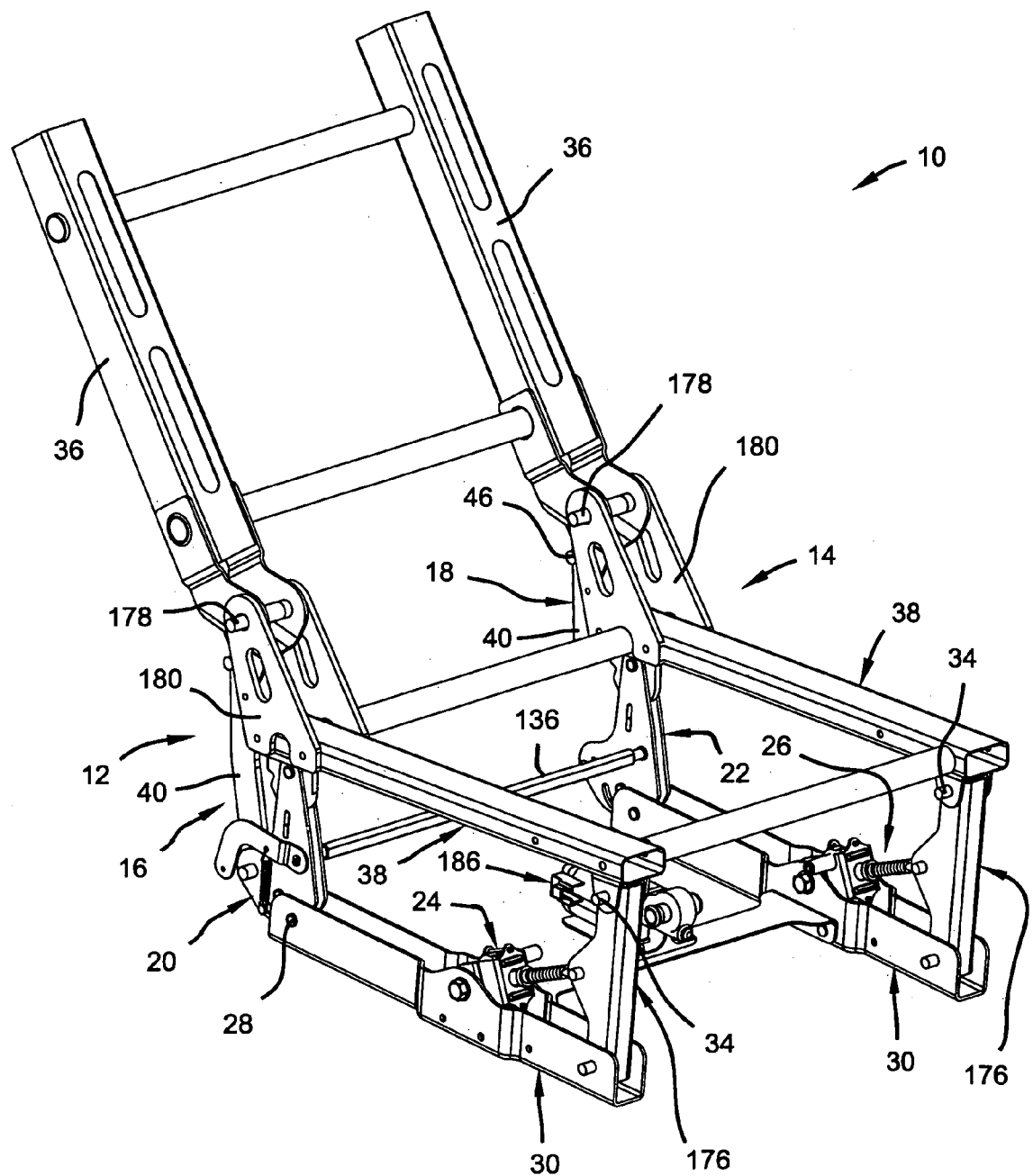
FIG. 1 is a perspective view of a recliner, floor-latch, and kneel assembly in accordance with the principles of the present teachings.
Figure 2:
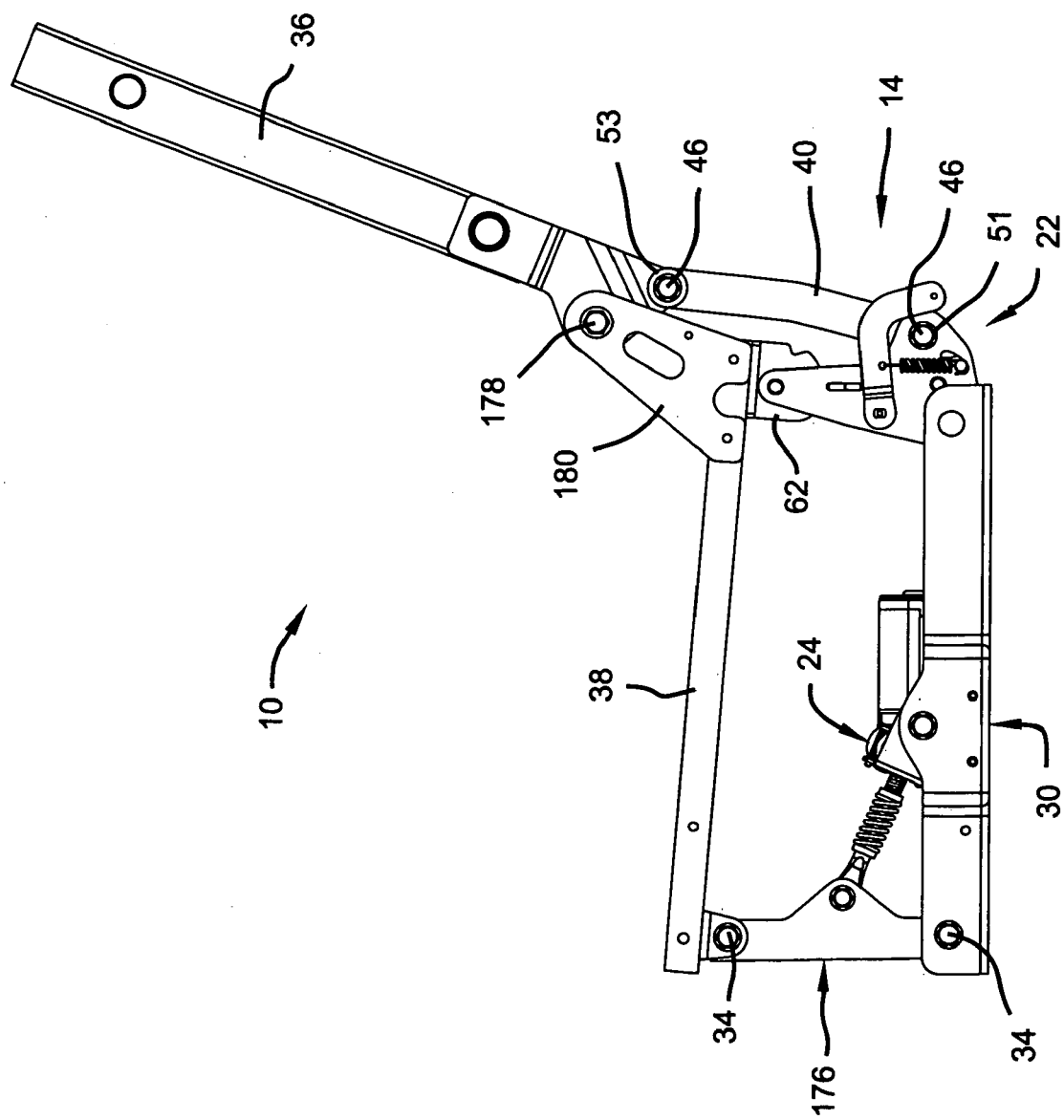
FIG. 2 is a side view of the a recliner, floor-latch, and kneel assembly of FIG. 1 in a design position.
Figure 3:
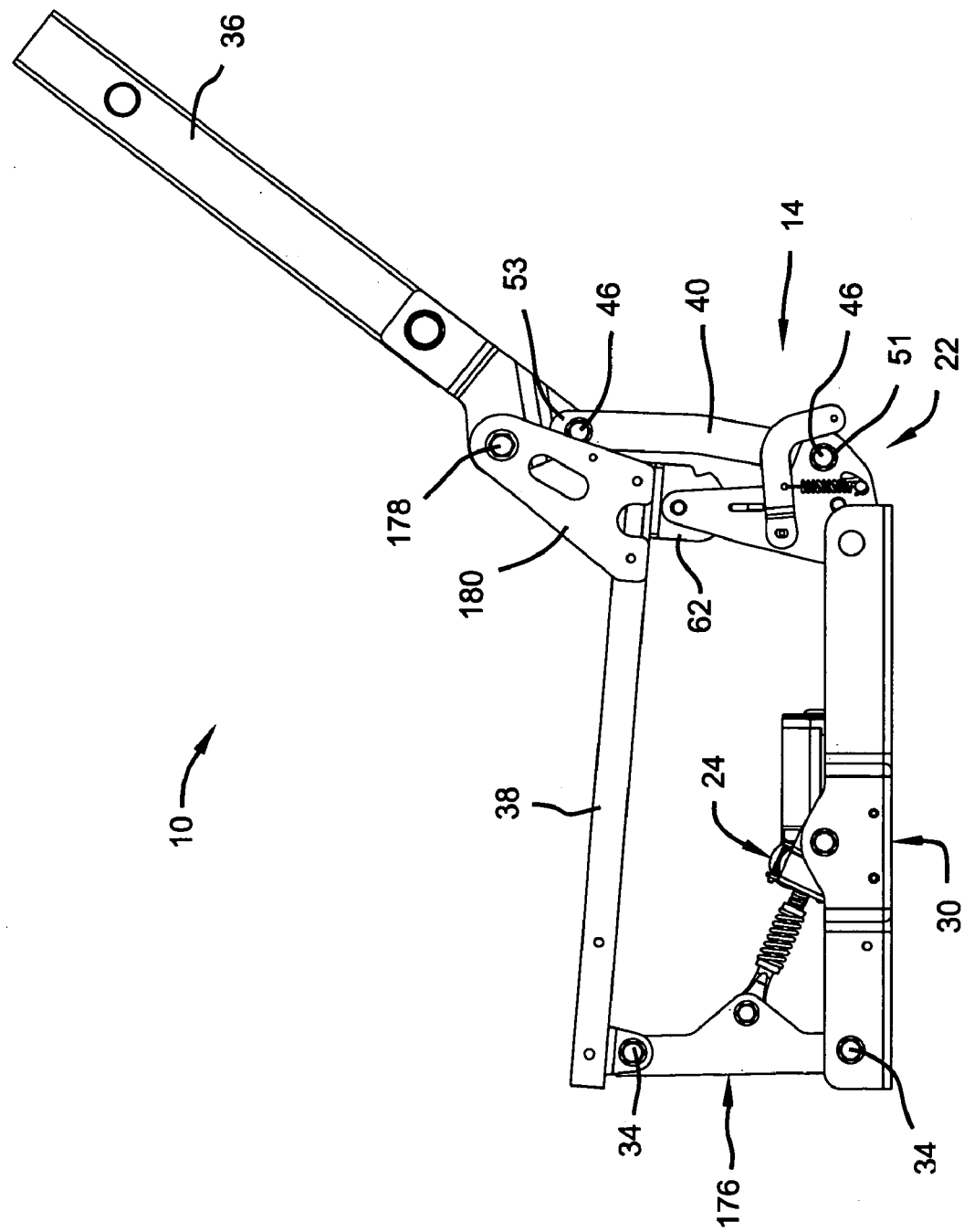
FIG. 3 is a side view of the a recliner, floor-latch, and kneel assembly of FIG. 1 in a reclined position.

The following description is merely exemplary in nature and is in no way intended to limit the teachings, its application, or uses.

With reference to FIGS. 1–5, a combination recliner, floor-latch, and kneel (RFK) assembly 10 for use with a seat assembly is provided. The RFK 10 is operable in a first mode to adjust the inclination of a seatback relative to a seat bottom. The RFK 10 is operable in a second mode to enable forward folding of a seatback relative to a seat bottom. The RFK 10 is operable in a third mode to allow passenger ingress and egress by forward dumping of the seat assembly.

The RFK assembly 10 includes operably interconnected first and second RFK halves 12, 14. The halves 12, 14 include first and second recliner mechanisms 16, 18, first and second floor-latch mechanisms 20, 22, and first and second kneel mechanisms 24, 26. The floor-latch mechanisms 20, 22 are adopted to selectively engage a pair of strikers 28 disposed on a pair of floor brackets 30. Such engagement serves to restrict rotation of the RFK 10 about a forward pivot 34, as shown in FIGS. 1–5 and 12–15. The kneel mechanisms 24, 26 are pivotably supported by the floor brackets 30 and serve to initiate articulation of the RFK 10, as will be described in more detail below.

The first and second recliner mechanisms 16, 18 each include a link 40 extending from the floor-latch mechanisms 20, 22 to one of a pair of seatback supports 36. Each link 40 includes a first end having a seat attachment aperture 42 and a second end having a latch attachment aperture 44. The seat attachment apertures 42 are rotatably attached to their respective seatback support 36 by a pivot 46. Similarly, the latch attachment apertures 44 are rotatably attached to their respective floor-latch mechanism 20, 22 by a pivot 46. It should be appreciated that the floor latch mechanisms 20, 22 are identically constructed and, therefore, only a single floor latch mechanism 20 will be described in detail herein.

Figure 7:
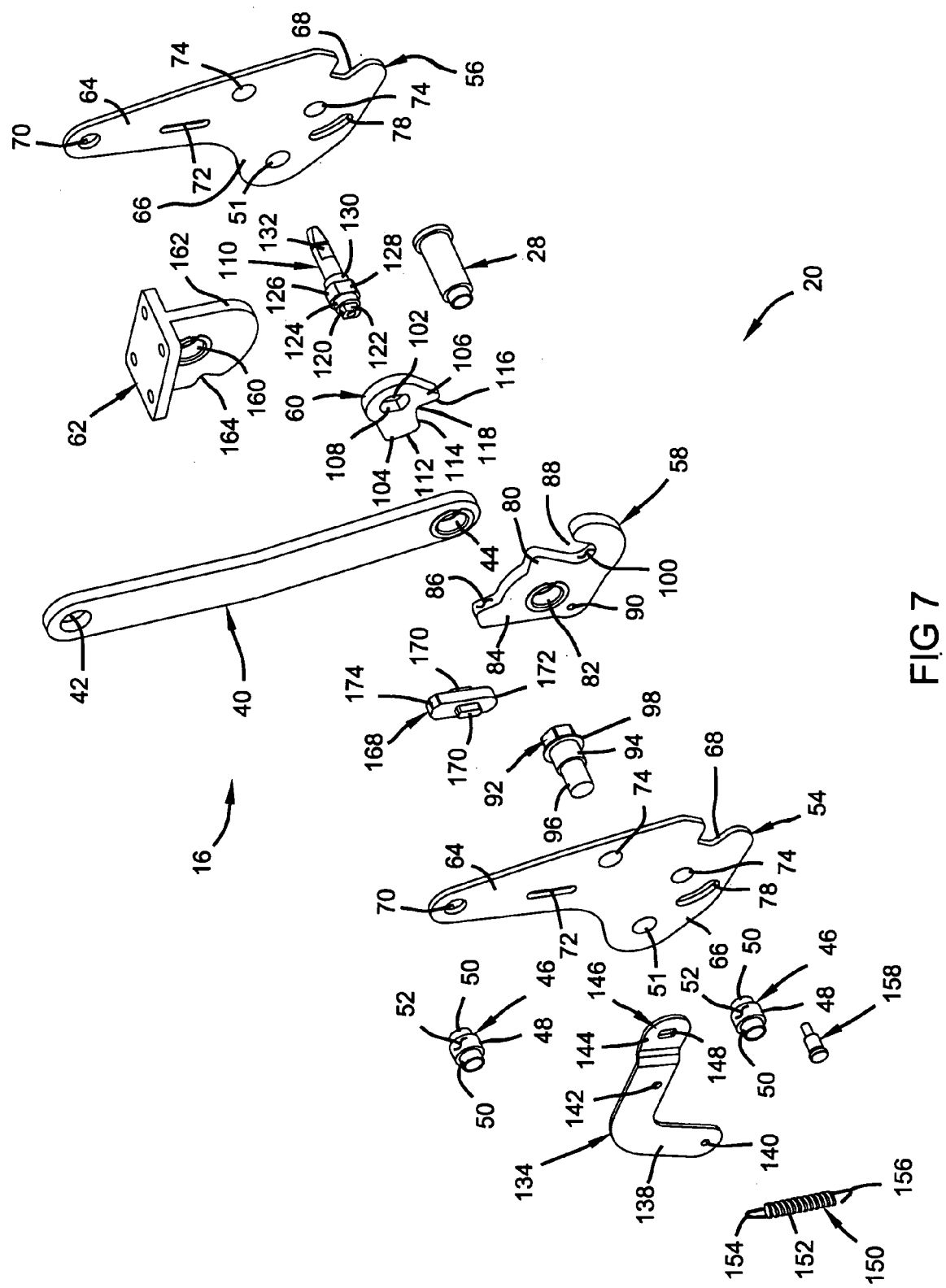
FIG. 7 is an exploded view of the floor-latch mechanism of FIG. 6.

FIG. 7 depicts pivot 46 including a central cylindrical section 48 and flanking cylindrical sections 50. The central cylindrical section 48 includes a reaction surface 52 and is rotatably received by the latch attachment aperture 44 in the link 40. The flanking cylindrical sections 50 are fixedly received by attachment apertures 51 in the latch mechanism 20. Each floor latch mechanism 20, 22 includes a first housing plate 54, a second housing plate 56, a claw 58, a cam plate 60, and a sector plate 62. The claw 58, cam plate 60, and sector plate 62 are operably supported between the first and second housing plates 54, 56 and cooperatively serve to toggle the floor latch mechanisms 20, 22 between a locked position (shown in FIG. 8) and an unlocked position (shown in FIG. 9).

The first and second housing plates 54, 56 include a first extension 64, a second extension 66, and a striker recess 68. The first extension 64 includes an attachment aperture 70, a slot 72, and a pivot aperture 74. The second extension 66 includes attachment aperture 51 for rotatably attaching the link 40 to the latch mechanisms 20, 22. In addition, each housing plate 54, 56 includes an attachment aperture 76, and a spring slot 78, both disposed generally between the striker recess 68 and the second extension 66.

The claw 58 includes a main body 80 having a central aperture 82, an extension 84 having an engagement surface 86, a striker recess 88, and a spring aperture 90. The central aperture 82 receives a pivot 92 having a central cylindrical section 94, a cylindrical section 96, and a shoulder 98. The central cylindrical section 94 includes an outer diameter generally greater than an outer diameter of the central cylindrical section 96 and generally smaller than an outer diameter of the shoulder 98. The pivot 92 is disposed through the attachment apertures 76 of the first and second housing plates 54, 56 and the central attachment aperture 82 of the claw 58. In this manner, the claw 58 is rotatably supported between the first and second housing plates 54, 56 and rotates about the outer diameter of the central cylindrical section 94. In addition to rotatably supporting the claw 58 between the first and second housing plates 54, 56, the pivot 92 further serves to hold the first housing plate 54 in spaced relationship to the second housing plate 56.

The shoulder 98 on the pivot 92 abuts an outer surface of the second housing plate 56 to restrict travel of the pivot 92 through the attachment aperture 76. The cylindrical section 96 of the pivot 92, therefore, extends through attachment aperture 76 of the first housing plate 54 such that the central cylindrical section 94 extends between inner surfaces of the first and second housing plates 54, 56. In this regard, the central cylindrical section 94 is disposed generally between the first and second housing plates 54, 56 and serves as a spacer therebetween.

The extension 84 of the claw 58 is integrally formed with the main body 80 generally opposite from the striker recess 88, as best shown in FIG. 7. The striker recess 88 includes an engagement surface 100 designed to matingly receive the striker 28 and lock the floor latch mechanism 20.

The cam plate 60 includes a central aperture 102, a first extension 104, and a second extension 106. The central aperture 102 includes a pair of flats 108 for engagement with a pivot 110. The first extension 104 includes a first reaction surface 112 and a second reaction surface 114. The second extension 106 includes a reaction surface 116 generally opposing the second reaction surface 114 of the first extension 104. A recess 118 is formed generally between the second reaction surface 114 of the first extension 104 and the reaction surface 116 of the second extension 106. The recess 118 is adapted to selectively receive extension 84 of the claw 58 when the claw 58 is in the unlocked position illustrated in FIG. 9.

As previously discussed, the central aperture 102 of the cam plate 60 receives the pivot 110 such that the cam plate 60 is rotatably supported between the first and second housing plates 54, 56. The pivot 110 includes a first cylindrical section 120 having flats 122, a second cylindrical section 124, a third cylindrical section 126 having flats 128, a fourth cylindrical section 130, and a key portion 132. The pivot 110 is rotatably received through attachment aperture 74 of the first and second housing plates 54, 56 such that the pivot 110 rotates about the third and fourth cylindrical sections 126, 130. In this manner, the second cylindrical section 124 is disposed generally between the first housing plate and the second housing plate 54, 56 and matingly receives the central aperture 102 of the cam plate 60. Specifically, the flats 128 of the third cylindrical section 126 matingly engaged flats 108 of the central aperture 102 such that the cam plate 60 is fixed for rotation with the pivot 110. The pivot 110 rotates relative to the first and second housing plates, 54, 56 about the second and fourth cylindrical sections 124, 130. In this manner, the first cylindrical section 120 and keyed portion 132 extend from the first and second housing plates 54, 56, respectively.

The first cylindrical section 120 of the pivot 110 matingly receives an actuation handle 134, while the keyed portion 132 fixably receives a cross bar 136. The actuation handle 134 provides an occupant with the ability to apply a force directly to the cam plate 60, pivot 110, and cross bar 136. The actuation handle 134 is generally L-shaped and includes a raised portion 138 and a recess portion 144. The raised portion 138 includes an attachment aperture 140 and a spring aperture 142. The recess portion 144 includes an attachment aperture 146. The attachment aperture 146 includes a pair of flats 148 for matingly engaging the flats 122 of pivot 110. In this manner, the actuation handle 134 is fixed for rotation with the cam plate 60 through interaction between flats 148 on the actuation handle 134 and the flats 122 on the pivot 110. A spring 150 rotationally biases the actuation handle 134 in the counterclockwise direction (CCW) relative to the view shown in FIGS. 8 and 9. The spring 150 includes a central coiled body 152 and first and second ends 154, 156. The first end 154 is received by the spring aperture 142 in the actuation handle 134, while the second end 156 is received by a spring post 158.

Figure 8:
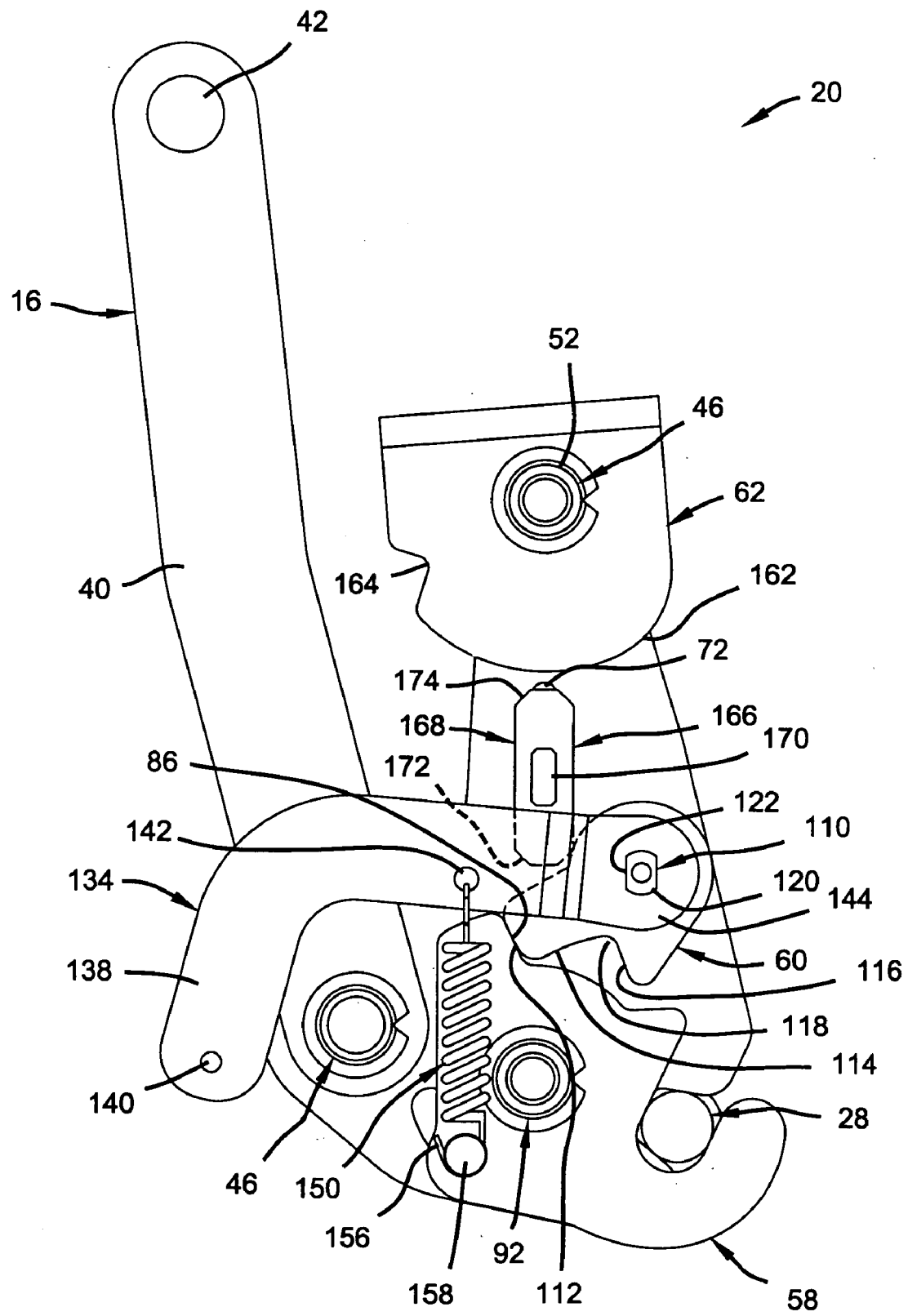
FIG. 8 is a plan view of the floor-latch mechanism of FIG. 6 with part of a housing removed to show the internal workings of the latch mechanism in a latched position.
Figure 9:
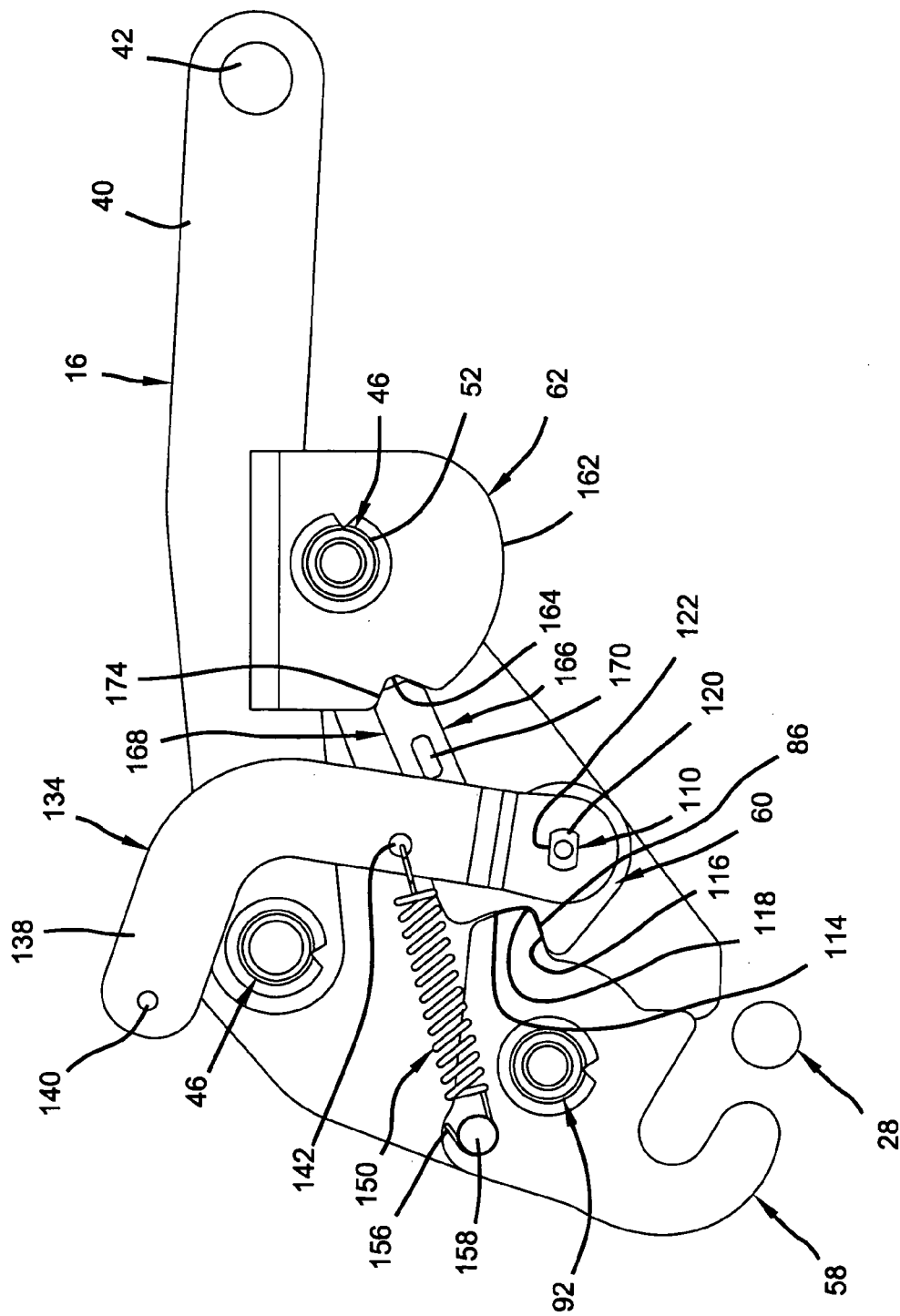
FIG. 9 is a plan view of the floor-latch mechanism of FIG. 6 with part of the housing removed to show the internal workings of the latch mechanism in an unlatched position.

The spring post 158 is received in spring aperture 90 of the claw 58, as best shown in FIGS. 8 and 9. In this manner, the spring 150 extends between the actuation handle 134 and the claw 58 to bias the actuation handle 134 in the counterclockwise direction relative to the view shown in FIGS. 8 and 9. Therefore, the spring 150 also biases the claw 58 in the clockwise direction.

The sector plate 62 includes a main attachment aperture 160, a cam surface 162, and a notch 164. The main attachment aperture 160 receives a pivot 46 and serves to rotatably support the first and second housing plates 54, 56. Specifically, the cylindrical sections 50 of the pivot 46 are received by the attachment apertures 70 in the first and second housing plates 54, 56 while the central cylindrical section 48 is rotatably received by the main attachment aperture 160 in the sector plate 62. In this manner, the first and second housing plates 54, 56 rotate about the reaction surface 52 of the pivot 46 relative to the sector plate 62.

Each floor latch mechanism 20, 22 further includes an interlock mechanism 166 that selectively restricts rotation of the claw 58, cam plate 60 and actuation handle 134. The interlock mechanism 166 includes a interlock cam 168 having a pair of guides 170 and first and second reaction surfaces 172, 174. The interlock cam 168 is slidably received within slots 72 in the first and second housing plates 54, 56. Specifically, the guides 170 are disposed in the respective slots 72 in the first and second housing plates 54, 56 to guide movement of the interlock cam 168. In a first position, the interlock cam 168 engages the cam plate 60 such that the first reaction surface 172 contacts the first extension 104 of the cam plate 60. In a second position, the interlock cam 168 contacts the sector plate 62 such that the second reaction surface 174 contacts the cam surface 162 thereon.

With particular reference to FIGS. 8 and 9, the operation of the first and second floor latch mechanisms 20, 22 will be described. FIG. 8 depicts the floor latch mechanism 20 in a locked condition such that the claw 58 engages the striker 28. To unlock the floor latch mechanism 20, a clockwise force is applied to the actuation handle 134 generally proximate to attachment aperture 140. However, because the floor latch mechanism 20 is positioned such that the interlock cam 168 is aligned with the cam surface 162 of the sector plate 62, operation of the floor latch mechanism, 20, 22 from the locked condition to the unlocked condition is prohibited.

Specifically, when the clockwise force is applied to the actuation handle 134 causing it to rotate in the clockwise direction, the first extension 104 of cam plate 60 rotates and contacts the first reaction surface 172 of the interlock cam 168. This causes the interlock cam 168 to slide within slots 72 of the first and second housing plates 54, 56. The second reaction surface 174 of the interlock cam 168 engages the cam surface 162 of the sector plate 62, thereby prohibiting further rotation of the cam plate 60.

Because the cam plate 60 is restricted from further rotation, the first reaction surface 112 of the cam plate 60 remains in contact with the engagement surface 86 of the claw 58. In this manner, the claw 58 is restricted from rotating in the clockwise direction relative to the view shown in FIG. 8 and, thus, will not release from the striker 28.

However, when the interlock cam 168 is co-aligned with the notch 164 in the sector plate 62 (as shown in FIG. 9), further rotation of the cam plate 60 is enabled, thereby enabling rotation of the claw 58 out of engagement with the striker 28. To co-align the interlock cam 168 with the notch 164 of the sector plate 62, the entire floor latch mechanism 20, 22 is rotated about pivot 46 in the sector plate 62 to the position illustrated in FIG. 9.

Once the notch 164 is co-aligned with the interlock cam 168, a clockwise force may be applied to the actuation handle 134 causing the cam plate 60 to rotate in the clockwise direction. Upon sufficient rotation of the actuation handle 134, the first reaction surface 112 of the cam plate 60 disengages the engagement surface 86 of the claw 58 allowing the claw 58 to rotate to the position illustrated in FIG. 9.

Once the claw 58 is sufficiently rotated, the striker 28 disengages the striker recess 88 and the floor latch mechanisms 20, 22 can rotate into the unlocked position. To restrict over rotation of the claw 58, the second extension 106 of the cam plate 60 contacts extension 84 of the claw 58. Specifically, the engagement surface 86 of the claw 58 contacts the reaction surface 116 of the cam plate 60, thereby holding the claw 58 in the unlocked position.

It should be noted, that rotation of the cam plate 60 in the clockwise direction relative to the view shown in FIGS. 8 and 9 causes the first extension 104 of the cam plate 60 to contact the first reaction surface 172 of the interlock cam 168, thereby causing the interlock cam 168 to slide within slot 72 of the first and second housing plates 54, 56. Therefore, the second reaction surface 174 of the interlock cam 168 engages the notch 164 in the sector plate 62. This provides enough clearance for the cam plate 60 to rotate in the clockwise direction and disengage the claw 58, as described above.

To return the floor latch mechanism 20 to the locked position, it is brought into proximity with the striker 28, such that the striker 28 is received by the striker recess 88 in the claw 58. A force is then exerted on the floor latch mechanisms 20 such that the striker 28 engages the striker recess 88. Once the striker 28 engages the striker recess 88, the claw 58 rotates in the counterclockwise direction relative to the view shown in FIGS. 8 and 9. Once the claw is sufficiently rotated in the counterclockwise direction, the striker 28 forcingly engages the engagement surface 100 of the striker recess 88 and places the floor latch mechanism 20 in the locked position. The cam plate 60 is rotated in the counterclockwise direction relative to the view shown in FIGS. 8 and 9 by the spring 150. This holds the floor latch mechanism 20 in the locked position. Specifically, as the claw 58 rotates in the counterclockwise direction, the extension 84 is removed from the recess 118 in the cam plate 60 and provides a clearance for the cam plate 60 to rotate under bias of the spring 150.

Once the cam plate 60 and actuation handle 134 are rotated sufficiently in the counterclockwise direction, the first reaction surface 112 of the cam plate will once again contact the engagement surface 86 of extension 84 and lock the cam plate 60 and claw 58 in the locked position, thereby holding the floor latch mechanism 20 in the locked position.

As previously discussed, the floor latch mechanisms 20, 22 must be pivoted about the floor brackets 30 such that the interlock cams 168 are co-aligned with notches 164 in the sector plates 62 to be toggled into the unlocked position. This pivoting of the floor latch mechanisms 20, 22 is achieved via the first and second kneel mechanisms 24, 26 depicted in FIGS. 1, 10 and 11. The first and second kneel mechanisms 24, 26 rotate the first and second floor latch mechanisms 20, 22 to adjust the relative rotational position between the sector plate 62 and floor latch mechanisms 20, 22 to thereby position the interlock cam 168 into alignment with notch 164. Specifically, the first and second kneel mechanisms 24, 26 rotate the first and second latch mechanisms 20, 22 about strikers 28 during rotation of the seatback and seat bottom supports 36, 38 relative to the floor bracket 30, as will be discussed further below.

Figure 4:
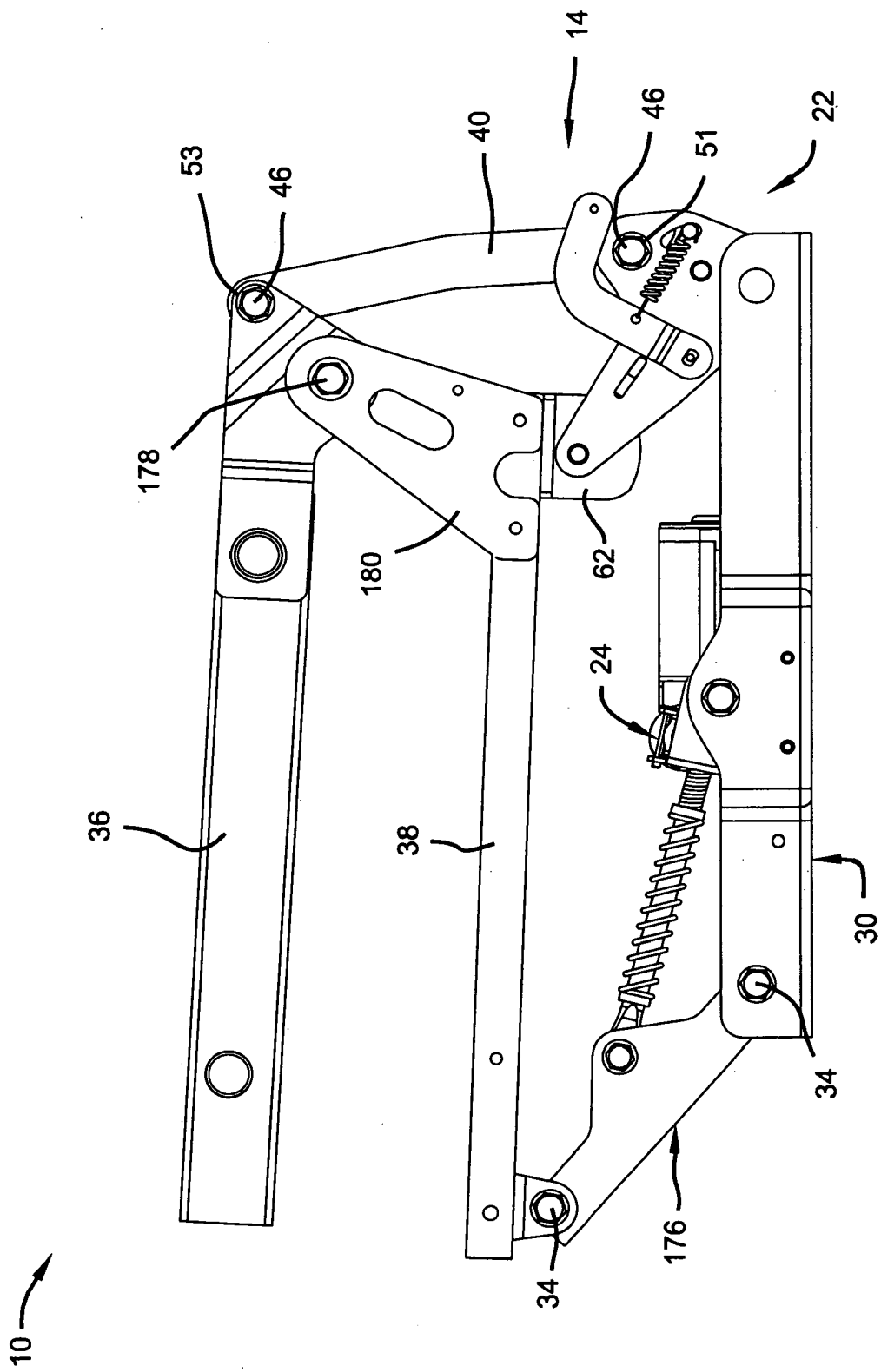
FIG. 4 is a side view of the a recliner, floor-latch, and kneel assembly of FIG. 1 in a fold-flat position.
Figure 5:
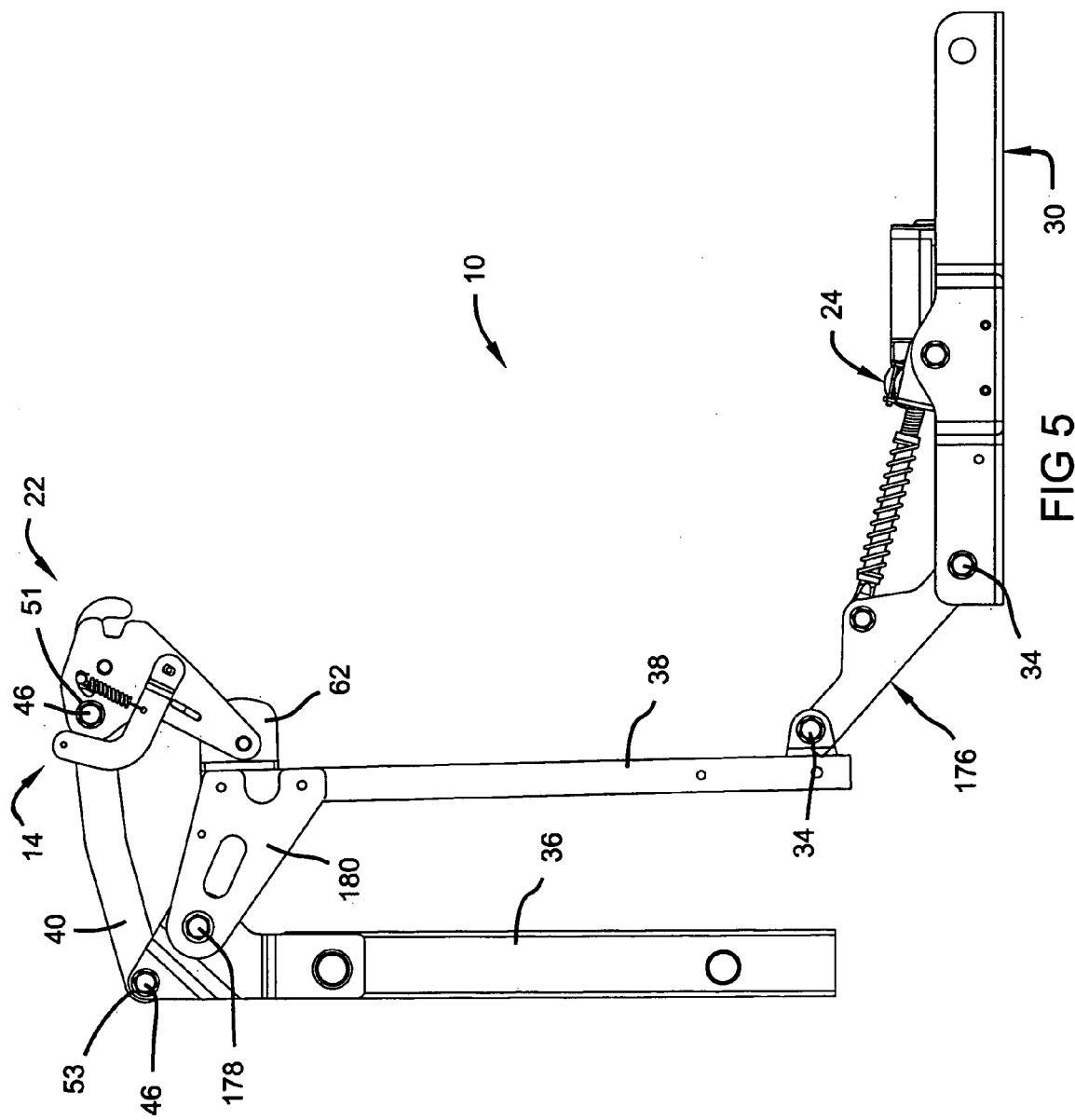
FIG. 5 is a side view of the a recliner, floor-latch, and kneel assembly of FIG. 1 in a dumped position.
Figure 6:
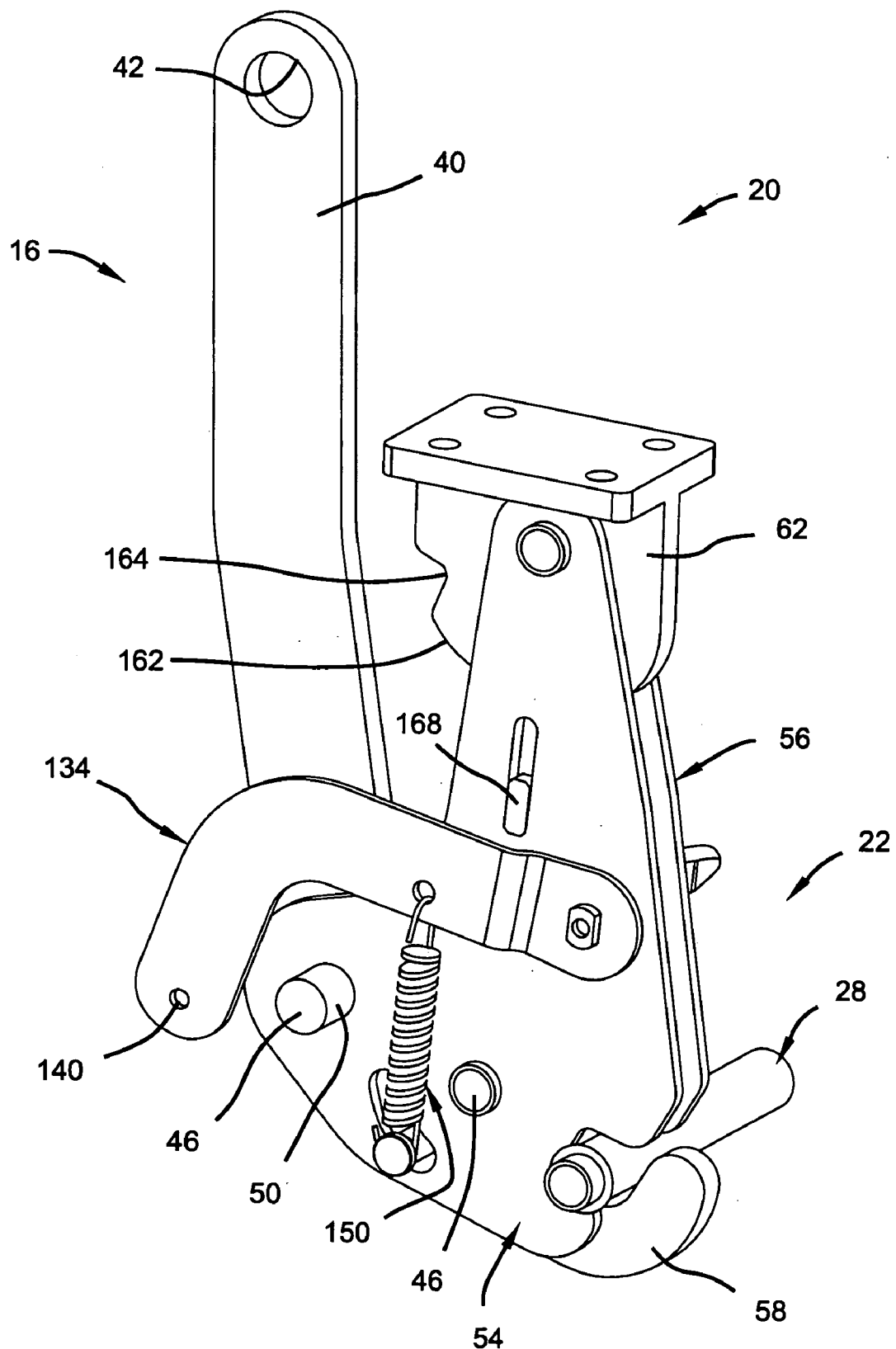
FIG. 6 is a perspective view of a floor-latch mechanism in accordance with the principles of the present teachings.

The first and second kneel mechanisms 24, 26 adjustably control reclining movement of the seatback supports 36 relative to the seat bottom support 38 through cooperation with the first and second recliner mechanisms 16, 18 to provide a desired angular position of the seatback supports 36 relative to the seat bottom supports 38. In addition, the kneel mechanisms 24, 26 further cooperate with the first and second recliner mechanisms 16, 18 to articulate the seatback supports 36 into a fold-flat position while concurrently kneeling the RFK 10 into a kneeled position relative to the floor bracket 30, as best shown in FIG. 4.

With particular reference to FIGS. 4 and 10–13, the first and second kneel mechanisms 24, 26 will be described. However, it should be appreciated that the first and second kneel mechanism 24, 26 are of identical construction and, therefore, only kneel mechanism 24 will be described in detail.

Figure 10:
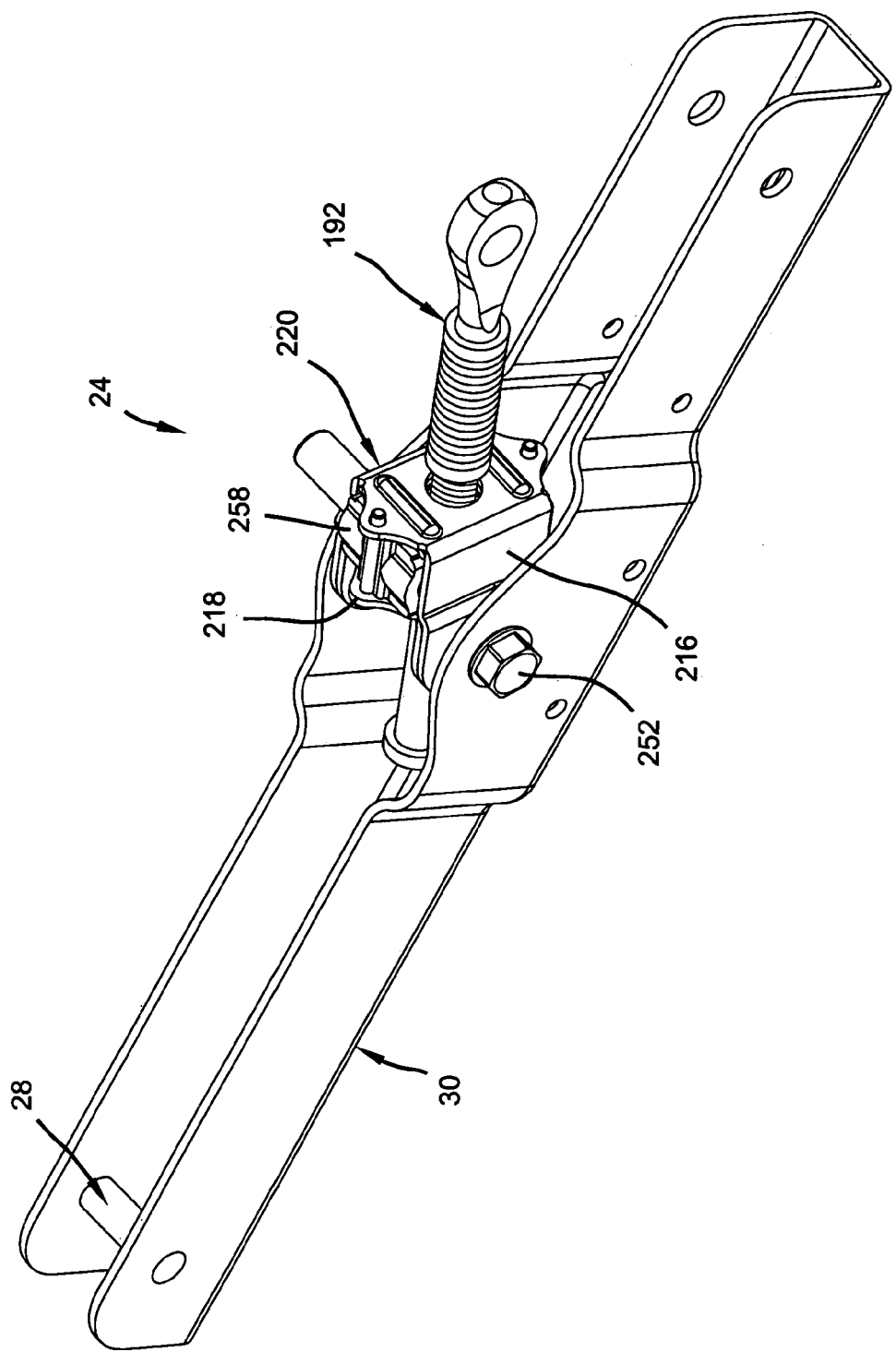
FIG. 10 is a perspective view of a kneel mechanism in accordance with the principles of the present teachings.
Figure 11:
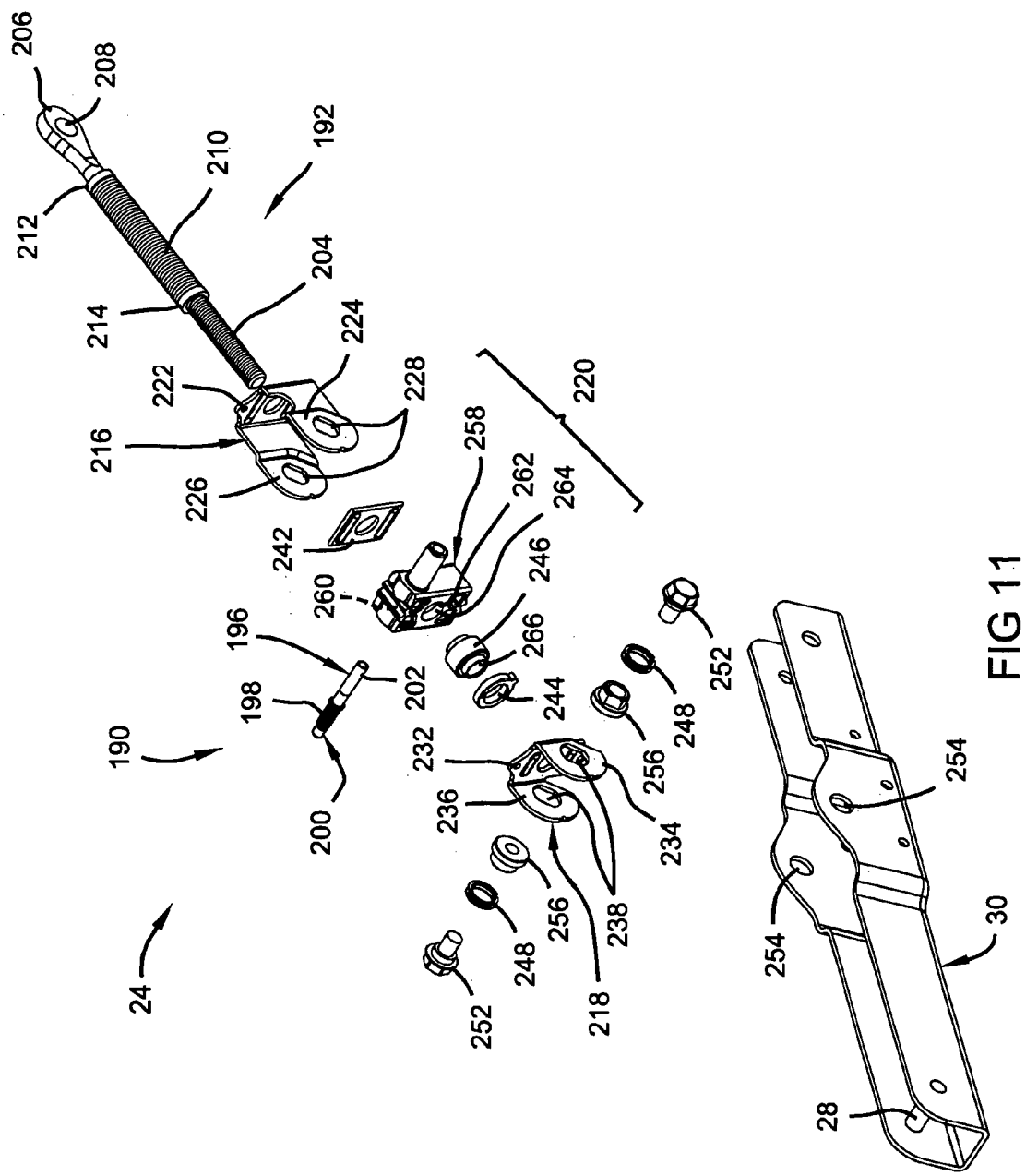
FIG. 11 is an exploded view of the kneel mechanism of FIG. 10.

FIGS. 10 and 11 depict kneel mechanism 24 including a drive mechanism 190, a driven mechanism 192, and a transmission assembly 194 for supporting and inter-engaging the drive mechanism 190 and the driven mechanism 192. The drive mechanism 190 includes a powered motor 186 (shown in FIG. 1) drivingly connected by a drive cable (not shown) to a transmission rod 196 which is journalled for rotation in the transmission assembly 194. The transmission rod 196 includes a worm gear 198 formed coaxially thereon adjacent a first end 200 thereof. At an opposite second end 202, the transmission rod 196 is generally smooth. The second end 202 also includes an end face having a recess for receiving the drive cable that is rotationally driven by the drive motor.

The driven mechanism 192 includes an elongated threaded recliner rod 204 including a first end defining a flat surface 206 having an aperture 208. The body of the recliner rod 204 coaxially mounts a spring 210 between a washer 212 and a sleeve 214. The threaded recliner rod 204 is received by the transmission assembly 194 for driving inter-engagement with the worm gear 198 of the drive mechanism's transmission rod 196. In this way, the recliner rod 204 axially moves through transmission assembly 194 upon actuation of the drive motor to provide the desired linear motion.

The transmission assembly 194 generally includes a mounting assembly having an outer plate 216 and an inner plate 218 that are cooperatively configured to accommodate a gear retainer assembly 220 therebetween. The outer and inner plates 216, 218 are preferably constructed of a high strength stamped metal or high carbon such as SAE 1050-1055 steel. When assembled, the outer and inner plates 216, 218 house the gear retainer assembly 220 in a high load carrying assembly having a relatively small packaging volume. As generally discussed above, the gear retainer assembly 220 interconnects the transmission rod 196 and the threaded recliner rod 204 for angularly positioning the supports 176 and floor latch mechanisms 22, 24 relative to the floor brackets 30.

The outer plate 216 is a generally U-shaped member having a central portion 222 joining first and second opposed legs 224, 226. The first and second legs 224, 226 have aligned apertures 228 therethrough for alignment with similar apertures to the inner plate 218. The central portion 222 of the outer plate 216 includes an aperture 230 to allow the threaded recliner rod 204 access to the gear retainer assembly 220. The central portion 222 also includes a pair of apertures for receiving fasteners to secure the outer and inner plates, 216, 218, together.

The inner plate 218 is shaped similar to the outer plate 216 and includes a central portion 232 flanked by first and second opposed legs 234, 236. The first and second opposed legs 234, 236 have aligned apertures 238 therethrough for alignment with the apertures 228 of the outer plate 216. Also, the central portion 232 includes an aperture 240 therethrough that is alignable with aperture 230 in the outer plate 216 to accommodate axial movement of the threaded recliner rod 204 through the gear retainer assembly 220.

When assembled, the first and second legs 224, 226 of the outer plate 216 overlap the first and second legs 234, 236 of the inner plate 218, as illustrated in FIG. 10. The gear retainer assembly 220 is sandwiched between the central portions 222, 232 of the inner and outer plates, 218, 216, respectively.

The mounting assembly also includes trunion bushings 248 mounted in the aligned apertures 228, 238 of the legs 224, 226 of the outer plate 216 and the legs 234, 236 of the inner plate 218, respectively. The trunion bushings 248 help secure the outer plate 216 to the inner plate 218, thereby securing the gear retainer assembly 220 therebetween. More specifically, the trunion bushings 248 include apertures 250 for receiving a fastener 252 for mounting the transmission assembly 194 to the floor bracket 30. The fasteners 252 are received through apertures 254 in the floor bracket 30 and threadably engage the nuts 256.

The gear retainer assembly 220 includes a gear housing 258, a helical nut gear 246, a thrust bearing 244, and a doubler plate 242. The gear housing 258 includes a drive mechanism passage 260, a gear cavity 262, and a driven mechanism passage 264 that each communicate with one another to allow the operative interconnection of the drive and driven mechanisms 190 and 192. The gear cavity 262 and the driven mechanism passage 264 are coaxially aligned. The drive mechanism passage 260 is perpendicular to the gear cavity 262 and driven mechanism passage 264. More particularly, the drive mechanism passage 260 is configured to receive and support the transmission rod 196 while the driven mechanism passage 264 is spaced from and generally perpendicular to drive mechanism passage 260 to accommodate the threaded recliner rod 204. The gear cavity 262 extends radially outward from the axis of the driven mechanism passage 264 to communicate with the drive mechanism passage 260 and accommodate the helical nut gear 246 and the thrust bearing 244. The gear housing 258 is preferably formed from a polymeric material and, more preferably, an injected molded plastic. Most preferably, the plastic material is nylon. However, it should be appreciated that a variety of other high compressive strength, toughness and wear-resistant materials generally known in the arm may be used to form the gear housing 258. By forming the gear housing 258 of a polymeric material, the overall weight of the linear kneel mechanisms 24, 26 are significantly reduced. Moreover, the configuration of the respective passages and cavities within the gear housing, as well as the light weight yet high strength provided by the plates 216 and 218, securely interconnect the operative components of the transmission assembly 194.

Disposed through the gear retainer assembly is a recliner rod passage for accommodating the linear displacement of the recliner rod 204. The recliner rod passage is defined by a threaded opening 266 through the helical nut gear 246, the driven mechanism passage 264, and the coaxially aligned apertures in the thrust bearing 244 and plates 242, 216 and 218.

An outer surface of the helical nut gear 246 is drivingly engaged by the worm gear 198 of the transmission rod 196. The threaded opening 266 in the helical nut gear 246 is drivingly engaged by the recliner rod 204. The thrust bearing 244 is coaxially mounted on the helical nut gear 246, while the nut gear 246 is received within the gear cavity 262 of the gear housing 258 such that the helical nut gear 246 is disposed in a proper position for rotation within the gear retainer assembly 220. The thrust bearing 244 is a ring-shaped member having a tab extending diametrically from an outer diameter surface thereof. The tab is received into a notch on the gear retainer assembly 220. Therefore, the thrust bearing prevents axial displacement of the helical nut gear 246, but permits the helical nut gear 246 to rotate within the gear retainer assembly 220. Furthermore, the doubler plate 242 is held in position abutting the opposite side of the helical nut gear 246 by the central portion 222 of the outer plate 216.

It should be noted that the first and second kneel mechanisms 24, 26 are preferably constructed in a similar fashion to the linear recliner mechanisms as disclosed in assignee's commonly-owned U.S. Pat. No. 6,322,146, the disclosure of which is incorporated herein by reference.

FIGS. 12–15 depict a vehicle seat 268 including a seatback 270, a seat bottom 272, and a RFK 10. The seatback 270 is fixedly attached to the pair of seatback supports 36. The seat bottom 272 is fixedly attached to the seat bottom supports 38.

Figure 12:
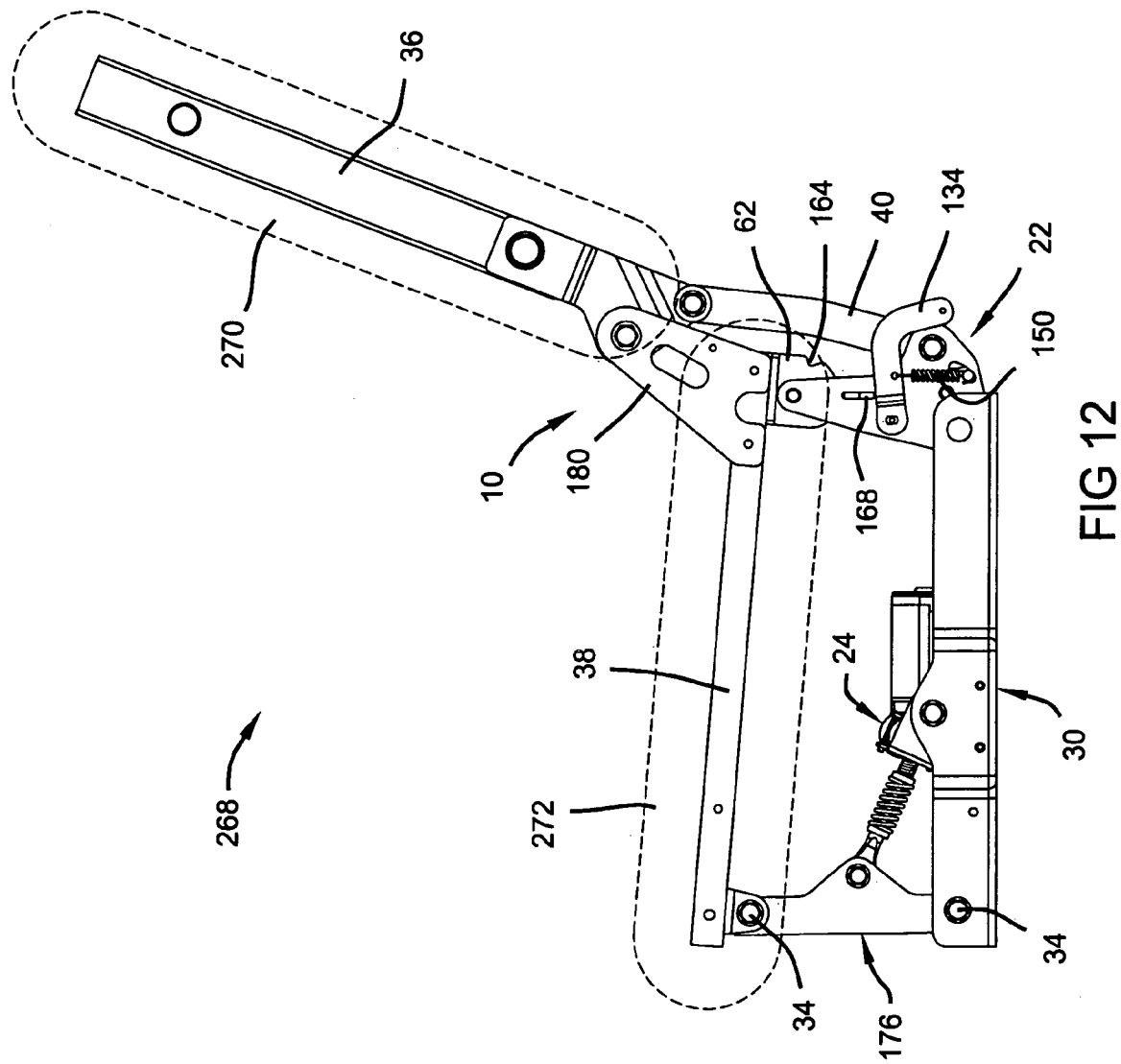
FIG. 12 is a side view of the recliner, floor-latch, and kneel assembly incorporated into a seat assembly and in a design position.
Figure 13:
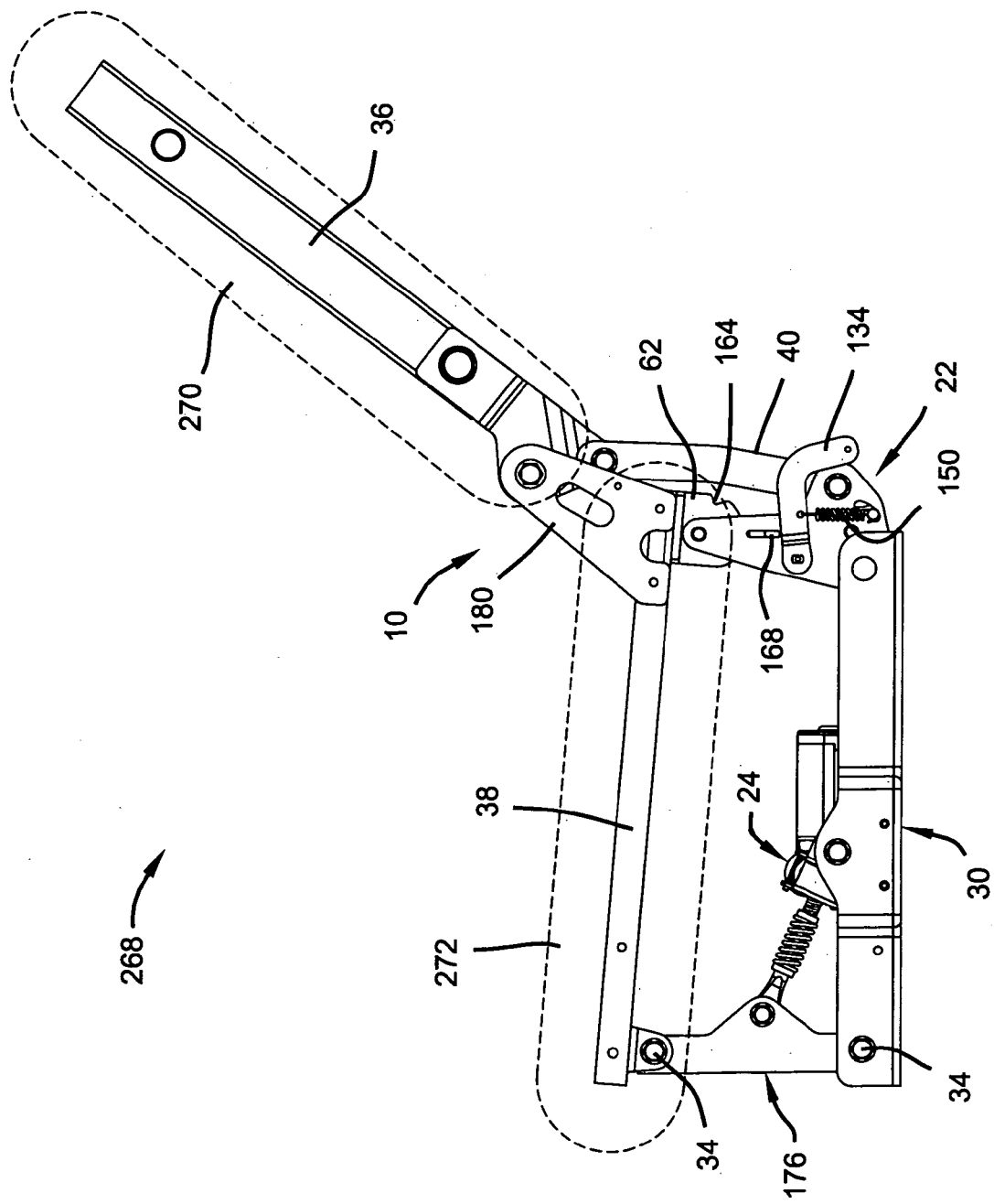
FIG. 13 is a side view of the seat assembly of FIG. 12 in a reclined position.
Figure 14:
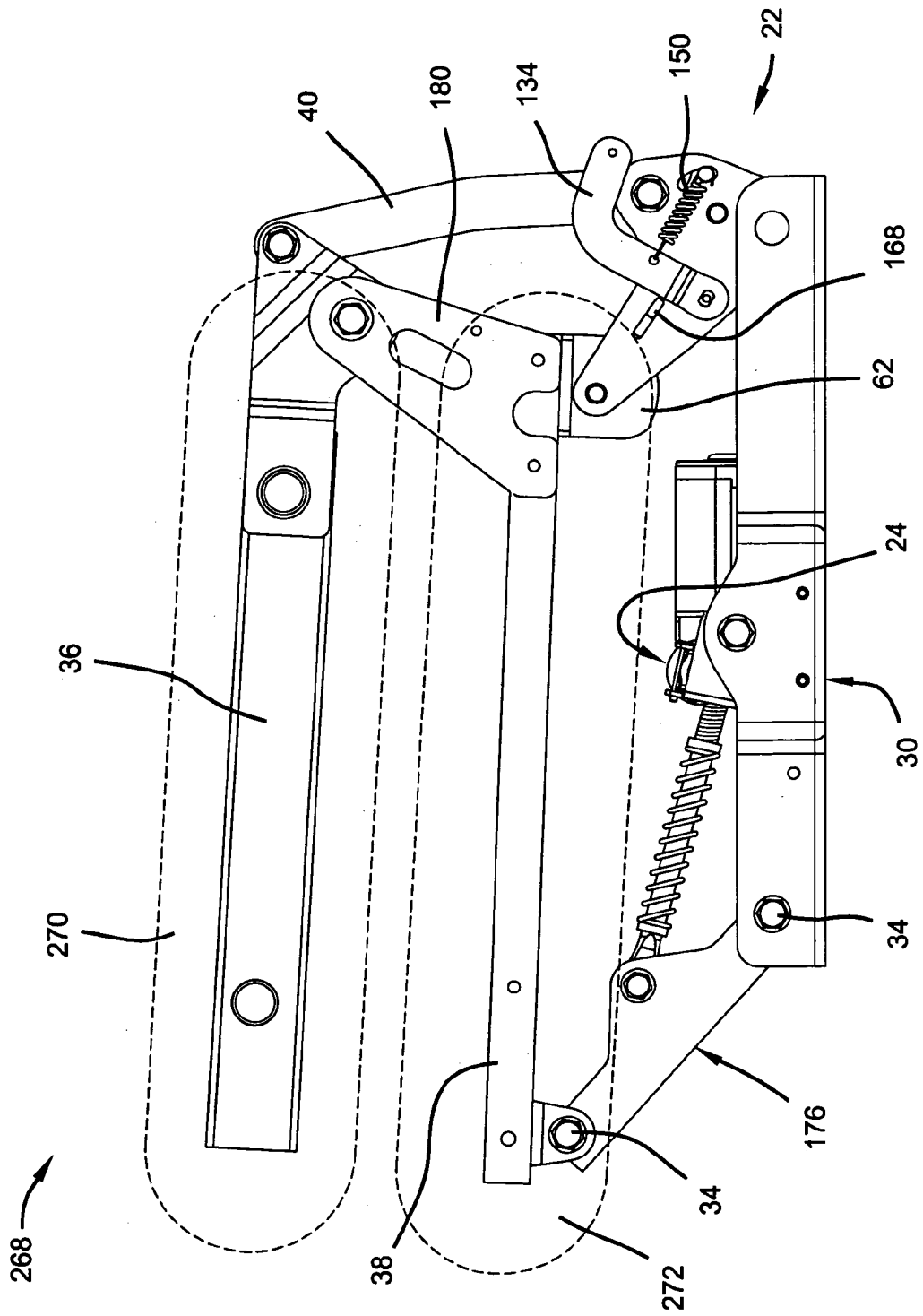
FIG. 14 is a side view of the seat assembly of FIG. 12 in a fold-flat position.

FIG. 12 depicts the vehicle seat 268 in a design position. During operation, a passenger activates the motor 186 that is operably attached to the drive mechanism 190 of the kneel mechanisms 24, 26. The transmission rod 196 including the worm gear 198 of the drive mechanism 190 rotates within the gear housing 258. The worm gear 198 meshingly engages the helical nut gear 246, thereby causing the helical nut gear 246 to rotate relative to the gear housing 258. The threaded opening 266 of the helical nut gear 246 threadably engages the threaded recliner rod 204. The rotation of the helical nut gear 246 causes the threaded recliner rod 204 to linearly displace relative to the gear housing 258 toward a kneeling position illustrated in FIG. 14. As illustrated in FIG. 14, the linear displacement of the threaded recliner rod 204 causes the front supports 176 to pivot or kneel in the counter-clockwise direction relative to the floor brackets 30. This causes the seat bottom supports 38 to displace forward, as well as downward, relative to the floor brackets 30. Additionally, the seat bottom supports 38 cause the first and second housing plates 54, 56 of the floor latch mechanisms 20, 22 to pivot in the counter-clockwise direction relative to the floor brackets 30. This causes the links 40 to displace upward and to the left relative to the floor brackets 30. The links 40 thereby apply a moment to the seatback supports 36. The moment causes the seatback supports 36 to pivot in the counter-clockwise direction and into the fold flat position illustrated in FIG. 14.

Figure 15:
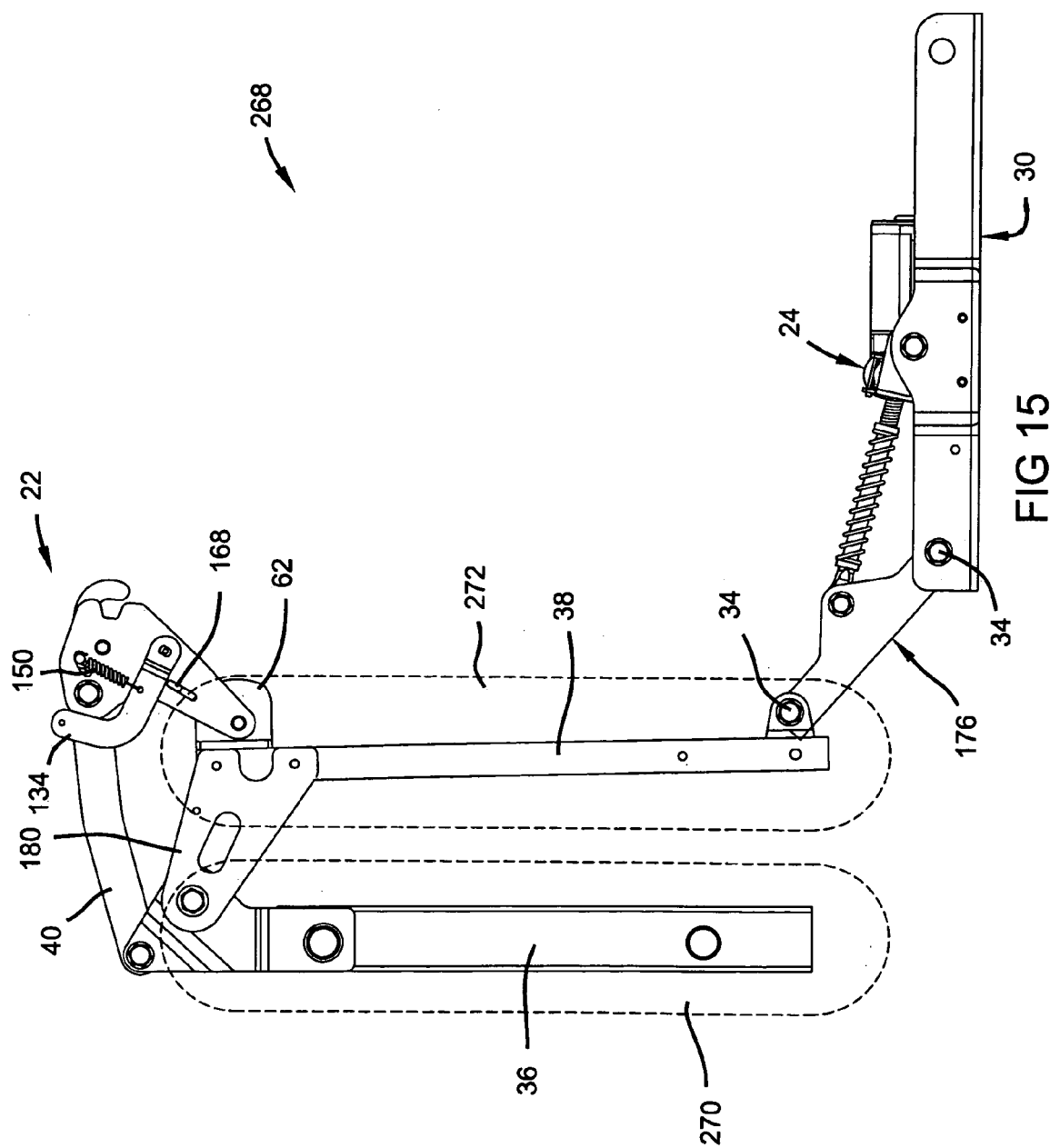
FIG. 15 is a side view of the seat assembly of FIG. 12 in a dumped position.

FIG. 15 illustrates the vehicle seat 268 in a dumped position. To achieve the dumped position, the vehicle seat 268 must first be configured into the fold flat position illustrated in FIG. 14. Therefore, it is important to note that, as described above, the pivotal displacement of the floor latch mechanisms 20, 22 relative to the floor brackets 30 causes the interlock cam 168 of the interlock mechanism 166 to become co-axially aligned with the notch 164 in sector plate 62. Therefore, a passenger may apply a counter-clockwise force relative to the view shown in FIG. 14 to the actuation handle 134 to disengage the floor latch mechanisms 20, 22 from the strikers 28. As described above with reference to FIGS. 6–9, such a force causes the actuation handle 134 to rotate the cam plate 60 into engagement with the interlock cam 168, thereby displacing the interlock cam 168 within slots 72 of the first and second housing plates 54, 56 and into the notch 164 of the sector plate 62. It should be appreciated that rotation of the actuation handle 134 attached to the second floor latch mechanism 22 also actuates the first floor latch mechanism 20 via the crossbar 136 illustrated in FIG. 1. Therefore, regardless of which floor latch mechanism 20, 22 the actuation handle is attached to, both actuate concurrently. Therefore, as the actuation handle 134 rotates the cam plates 60 the claws 58 are also rotated via the springs 150. The springs 150 rotate the claws 58 out of engagement with the strikers 28. With the claws 58 disengaged from the strikers 28, the vehicle seat 268 is free to be pivoted about the front supports 176 and into the dumped position illustrated in FIG. 15. To return the vehicle seat 268 to the fold flat position illustrated in FIG. 14, the vehicle seat 268 is simply pivoted about the front supports 176 such that the floor latch mechanisms 20, 22 are in close proximity to the strikers 28. The strikers 28 are then received in the striker recesses 68 of the claws 58 causing the floor latch mechanisms 20, 22 to engage the striker plate. Additionally, a passenger may activate the motor operably attached to the kneel mechanisms 24, 26 to transition the vehicle seat 268 from the fold flat position illustrated in FIG. 14 to the design position illustrated in FIG. 12.

The description is merely exemplary in nature and, thus, variations are intended to be within the scope and not as a departure from the spirit and scope of the teachings.

What is claimed is:

1. An adjustment mechanism for a vehicle seat including a seat bottom and a seatback coupled to the seat bottom, the adjustment mechanism comprising:
    a first kneel mechanism disposed between the seat bottom and the vehicle, said first kneel mechanism selectively translating the vehicle seat relative to the vehicle between a use position and a kneeled position;
    a first latch mechanism supported by the seat bottom and operable between a locked position and an unlocked position, said first latch mechanism allowing pivotal movement of the vehicle seat relative to the vehicle when the seat bottom is in said kneeled position and said first latch mechanism is in said unlocked position; and
    an interlock mechanism disposed between said first latch mechanism and the seat bottom, said interlock mechanism preventing movement of said first latch mechanism from said locked position to said unlocked position unless the vehicle seat is in said kneeled position.

2. The adjustment mechanism of claim 1, further comprising a recliner mechanism operable to rotate the seatback relative to the seat bottom when the vehicle seat is translated relative to the vehicle.

3. The adjustment mechanism of claim 2, wherein said recliner mechanism includes a link extending between said first latch mechanism and the seatback.

4. The adjustment mechanism of claim 3, wherein said link is rotatably attached to said first latch mechanism at a first end and rotatably attached to the seatback at a second end.

5. The adjustment mechanism of claim 2, wherein said recliner mechanism is operable to rotate the seatback into a fold-flat position when the vehicle seat is translated into said kneeled position.

6. The adjustment mechanism of claim 1, wherein said first kneel mechanism is a linear adjustment mechanism.

7. The adjustment mechanism of claim 6, wherein said linear adjustment mechanism includes a motor.

8. The adjustment mechanism of claim 6, wherein said linear adjustment mechanism includes a recliner rod operable to reciprocate linearly relative to the vehicle seat to position the seat bottom relative to the vehicle.

9. The adjustment mechanism of claim 1, wherein said first kneel mechanism is operable to lower the seat bottom relative to the vehicle when the vehicle seat is translated from said design position to said kneeled position.

10. The adjustment mechanism of claim 1, further comprising a lower bracket fixedly attached to the vehicle and rotatably supporting said first kneel mechanism, said first latch mechanism, and the vehicle seat.

11. The adjustment mechanism of claim 10, wherein said lower bracket includes a striker rotatably engaging said first latch mechanism in said locked position to restrict rotation of the vehicle seat relative to the vehicle.

12. The adjustment mechanism of claim 1, further comprising a lift mechanism operable to pivot the seat assembly when said first latch mechanism is in said unlocked position.

13. The adjustment mechanism of claim 1, further comprising a second latch mechanism connected to the vehicle seat and operable between a locked position and an unlocked position to selectively pivot the seat bottom relative to the vehicle.

14. The adjustment mechanism of claim 1, further comprising a second kneel mechanism connected to the vehicle seat and operable to translate the vehicle seat relative to the vehicle.

15. The adjustment mechanism of claim 14, wherein said second kneel mechanism is driven concurrently with said first kneel mechanism.

16. The adjustment mechanism of claim 1, wherein said interlock mechanism includes a sector plate supported by the vehicle seat and an interlock pin slidably supported by said first latch mechanism.

17. The adjustment mechanism of claim 16, wherein said sector plate includes a recess and a cam surface, said recess receiving said interlock pin to permit actuation of said first latch mechanism and engaging said cam surface to prevent actuation of said first latch mechanism.

18. A vehicle seat assembly comprising:
    a seat bottom;
    a seatback pivotally supported by said seat bottom; and
    an adjustment mechanism comprising:
        a first kneel mechanism disposed between said seat bottom and the vehicle, said first kneel mechanism selectively translating said vehicle seat relative to the vehicle between a use position and a kneeled position;
        a first latch mechanism supported by said seat bottom and operable between a locked position and an unlocked position, said first latch mechanism allowing pivotal movement of the vehicle seat relative to the vehicle when said seat bottom is in said kneeled position and said first latch mechanism is in said unlocked position; and
        an interlock mechanism disposed between said first latch mechanism and said seat bottom, said interlock mechanism preventing movement of said first latch mechanism from said locked position to said unlocked position unless the vehicle seat is in said kneeled position.

19. The vehicle seat assembly of claim 18, further comprising a recliner mechanism operable to rotate said seatback relative to said seat bottom when the vehicle seat is translated relative to the vehicle.

20. The vehicle seat assembly of claim 19, wherein said recliner mechanism includes a link extending between said first latch mechanism and said seatback.

21. The vehicle seat assembly of claim 19, wherein said link is rotatably attached to said first latch mechanism at a first end and rotatably attached to said seatback at a second end.

22. The vehicle seat assembly of claim 19, wherein said recliner mechanism is operable to rotate said seatback into a fold-flat position when the vehicle seat is translated into said kneeled position.

23. The vehicle seat assembly of claim 18, wherein said first kneel mechanism is a linear adjustment mechanism.

24. The vehicle seat assembly of claim 23, wherein said linear adjustment mechanism includes a motor.

25. The vehicle seat assembly of claim 23, wherein said linear vehicle seat assembly includes a recliner rod operable to reciprocate linearly relative to the seat to position said seat bottom relative to the vehicle.

26. The vehicle seat assembly of claim 18, wherein said first kneel mechanism is operable to lower said seat bottom relative to the vehicle when the vehicle seat is translated from said design position to said kneeled position.

27. The vehicle seat assembly of claim 18, further comprising a lower bracket fixedly attached to the vehicle and rotatably supporting said first kneel mechanism, said first latch mechanism, and the vehicle seat.

28. The vehicle seat assembly of claim 27, wherein said lower bracket includes a striker rotatably engaging said first latch mechanism in said locked position to restrict rotation of the vehicle seat relative to the vehicle.

29. The vehicle seat assembly of claim 18, further comprising a lift mechanism operable to pivot the vehicle seat assembly when said first latch mechanism is in said unlocked position.

30. The vehicle seat assembly of claim 18, further comprising a second latch mechanism connected to the vehicle seat and operable between a locked position and an unlocked position to selectively pivot said seat bottom relative to the vehicle.

31. The vehicle seat assembly of claim 18, further comprising a second kneel mechanism connected to the vehicle seat and operable to translate the vehicle seat relative to the vehicle.

32. The vehicle seat assembly of claim 31, wherein said second kneel mechanism is driven concurrently with said first kneel mechanism.

33. The vehicle seat assembly of claim 18, wherein said interlock mechanism includes a sector plate supported by the vehicle seat and an interlock pin slidably supported by said first latch mechanism.

34. The vehicle seat assembly of claim 33, wherein said sector plate includes a recess and a cam surface, said recess receiving said interlock pin to permit actuation of said first latch mechanism and engaging said cam surface to prevent actuation of said first latch mechanism.

* * * * *